United States Patent
Gleason et al.

(10) Patent No.: US 11,517,149 B2
(45) Date of Patent: Dec. 6, 2022

(54) FLOWER MILL ASSEMBLY

(71) Applicant: Flower Mill LLC, Phoenix, AZ (US)

(72) Inventors: John P. Gleason, Leamington (CA); Jason Kennedy, Phoenix, AZ (US); Aaron Looft, Phoenix, AZ (US)

(73) Assignee: Flower Mill LLC, Phoenix, AZ (US)

( * ) Notice: Subject to any disclaimer, the term of this patent is extended or adjusted under 35 U.S.C. 154(b) by 139 days.

(21) Appl. No.: 16/800,378

(22) Filed: Feb. 25, 2020

(65) Prior Publication Data
US 2021/0259470 A1  Aug. 26, 2021

(51) Int. Cl.
*A47J 42/42* (2006.01)
*A47J 42/34* (2006.01)

(52) U.S. Cl.
CPC ............ *A47J 42/42* (2013.01); *A47J 42/34* (2013.01)

(58) Field of Classification Search
CPC .. A47J 42/00; A47J 42/14; A47J 42/12; A47J 42/20; A47J 42/32; A47J 42/34
See application file for complete search history.

(56) References Cited

U.S. PATENT DOCUMENTS

| | | | |
|---|---|---|---|
| 7,533,838 B2 | 5/2009 | Kalogroulis | |
| 8,002,213 B2 | 8/2011 | Stehr | |
| 8,393,563 B2 | 3/2013 | Chaoui | |
| 8,695,906 B2 | 4/2014 | Hainbach | |
| 9,939,025 B2 | 4/2018 | Palmer | |
| 10,471,436 B2 | 11/2019 | Enderle | |
| 2013/0214068 A1* | 8/2013 | Camitta | B02C 18/2216 241/83 |
| 2016/0100715 A1 | 4/2016 | Staiano | |
| 2019/0150666 A1* | 5/2019 | Wozniak | A47J 42/34 |
| 2020/0237156 A1* | 7/2020 | Brouillac | A47J 42/38 |
| 2020/0390285 A1* | 12/2020 | Galaviz | A47J 42/34 |

FOREIGN PATENT DOCUMENTS

WO   2016/157035 A1   10/2016

* cited by examiner

*Primary Examiner* — Jessica Cahill
*Assistant Examiner* — Mohammed S. Alawadi
(74) *Attorney, Agent, or Firm* — Bodman PLC

(57) ABSTRACT

A flower mill assembly grinds vegetation into ground vegetation. The flower mill assembly includes a container defining an opening and an interior chamber for holding vegetation before it is ground and for collecting ground vegetation after the vegetation is ground. A sifting screen is secured to the container within the interior chamber. The sifting screen allows the ground vegetation to pass therethrough while preventing the vegetation from passing therethrough. A knob covers the opening of the container to enclose the interior chamber. A rotor is secured to the knob. The rotor defines a grinding surface, a center axis, and at least one grinding channel, whereby the rotation of the rotor grinds the vegetation disposed adjacent the grinding surface and the at least one grinding channel.

13 Claims, 8 Drawing Sheets

FLOWER MILL ASSEMBLY

BACKGROUND ART

1. Field of the Invention

The invention relates to a flower mill assembly. More particularly, the invention relates to a flower mill assembly capable of grinding vegetation in a manner that allows the vegetation to retain its desired properties.

2. Description of the Related Art

Herbs, leaves and flowers are often ground into finer structures so that they may be consumed in some manner such as cooking or inhaling. The act of grinding often involves ripping or shearing the vegetation with knives or other sharp objects. U.S. Pat. No. 8,393,563 discloses a handheld tobacco grinder that includes knives extending out of a plate designed to cut and rip the vegetation. Ripping or shearing damages the vegetation, releasing and mixing terpenes and natural oils thereby changing the scent and flavor profiles as well as the texture of the vegetation.

SUMMARY OF THE INVENTION

A flower mill assembly grinds vegetation into ground vegetation. The flower mill assembly includes a container defining an opening and an interior chamber for holding vegetation before it is ground, and for collecting ground vegetation after the vegetation is ground up. A sifting screen is secured to the container within the interior chamber. The sifting screen allows the ground vegetation to pass therethrough while preventing the unground vegetation from passing therethrough. A knob covers the opening of the container to enclose the interior chamber. A rotor is secured to the knob. The rotor defines a grinding surface, a center axis, and at least one grinding channel, whereby the rotation of the rotor grinds the vegetation disposed adjacent the grinding surface and at least one grinding channel.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
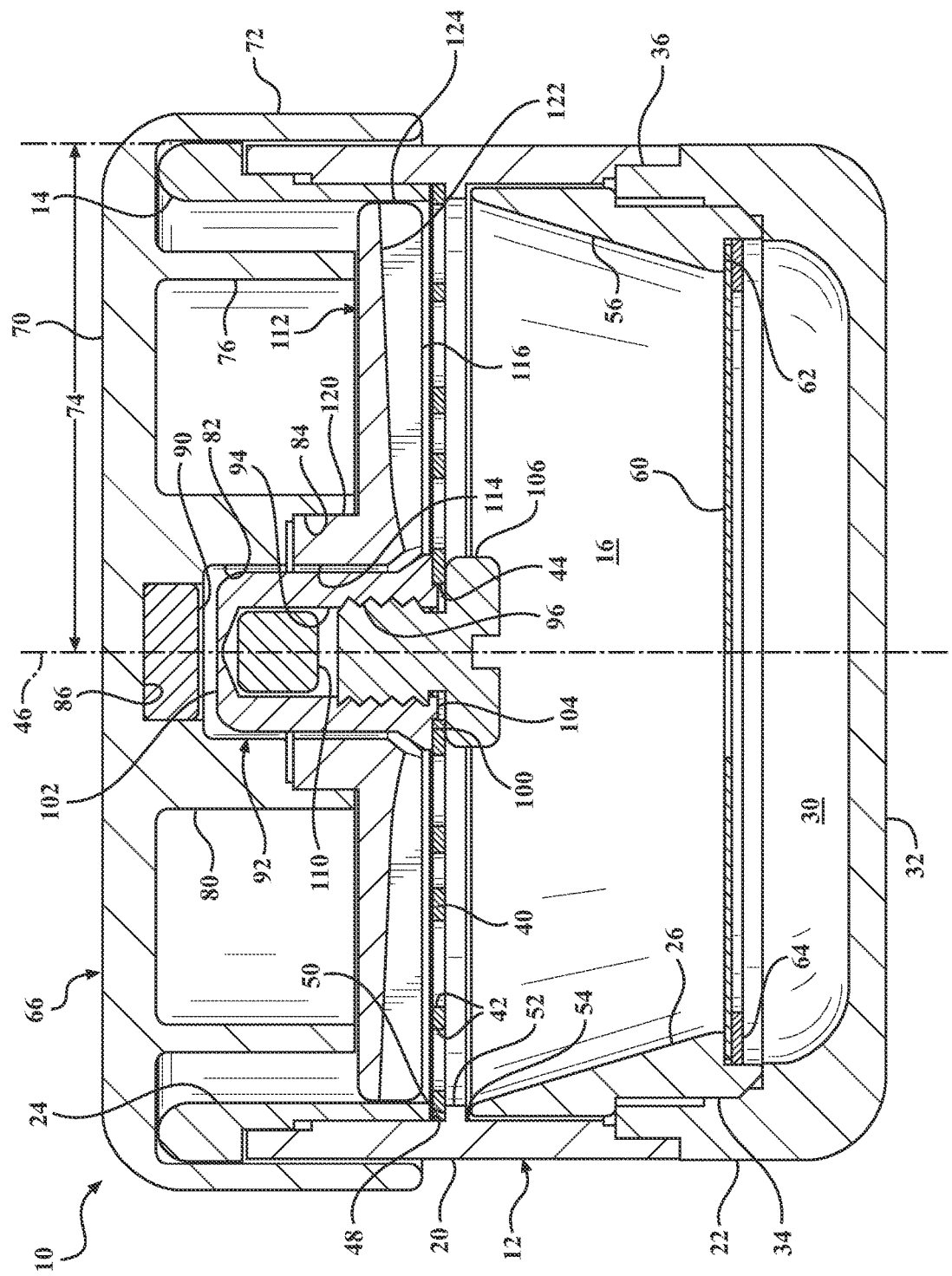
FIG. 1 is a cross-sectional side view of one embodiment.
Figure 2:
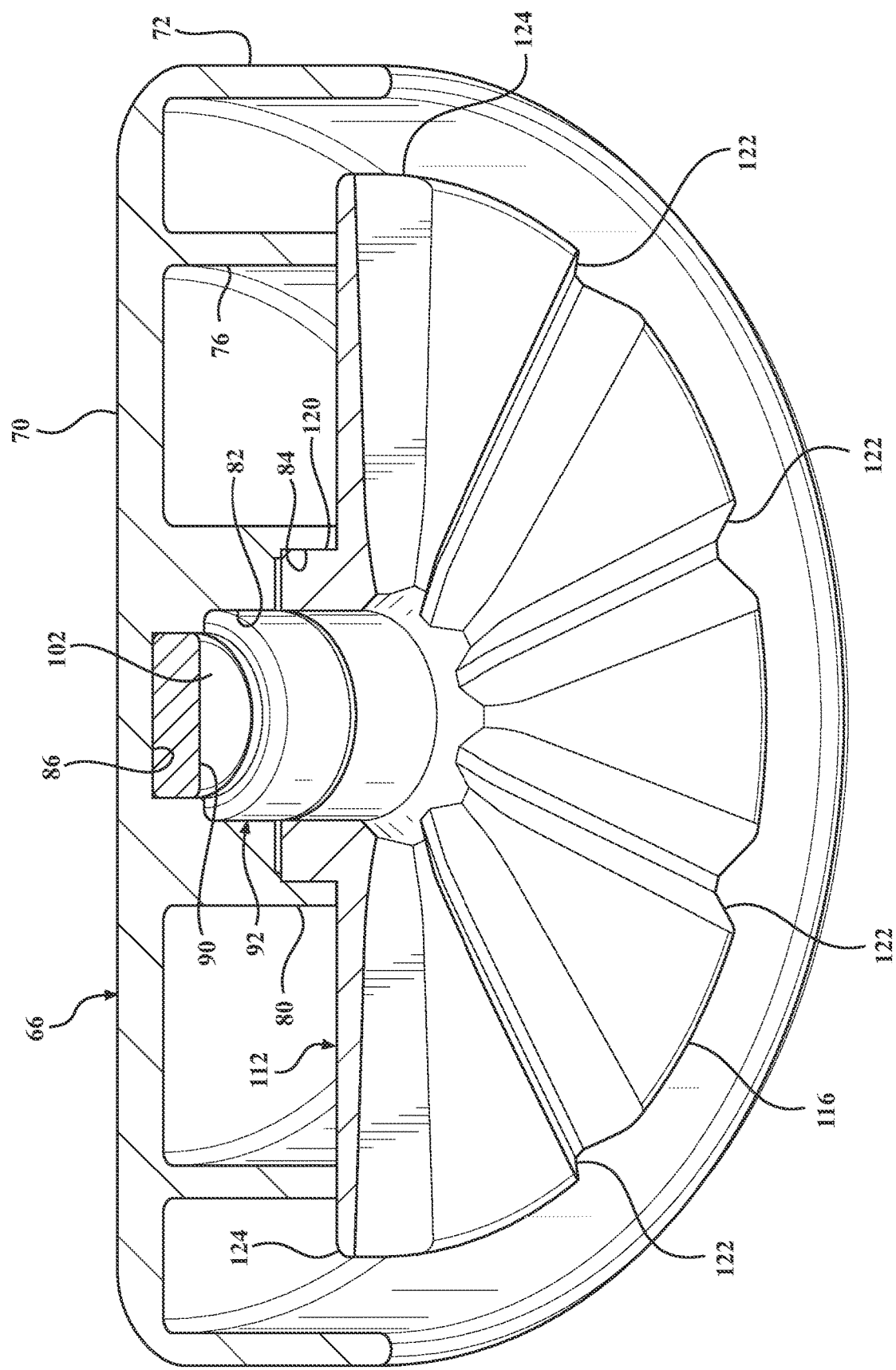
FIG. 2 is a cross-sectional perspective view of a knob and rotor used in the embodiment shown in FIG. 1.
Figure 3:
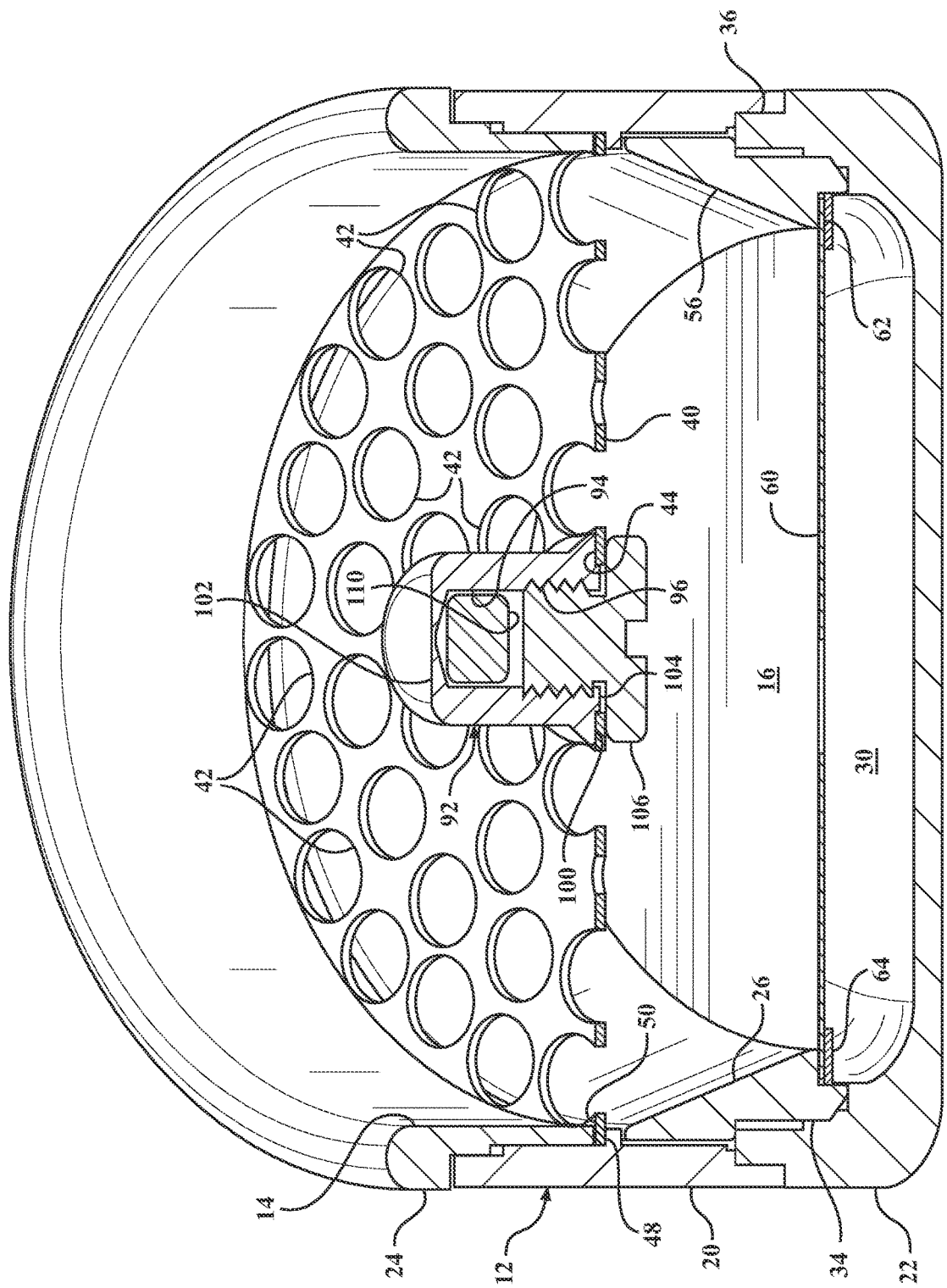
FIG. 3 is a cross-sectional perspective view of a container used in the embodiment shown in FIG. 1.
Figure 4:
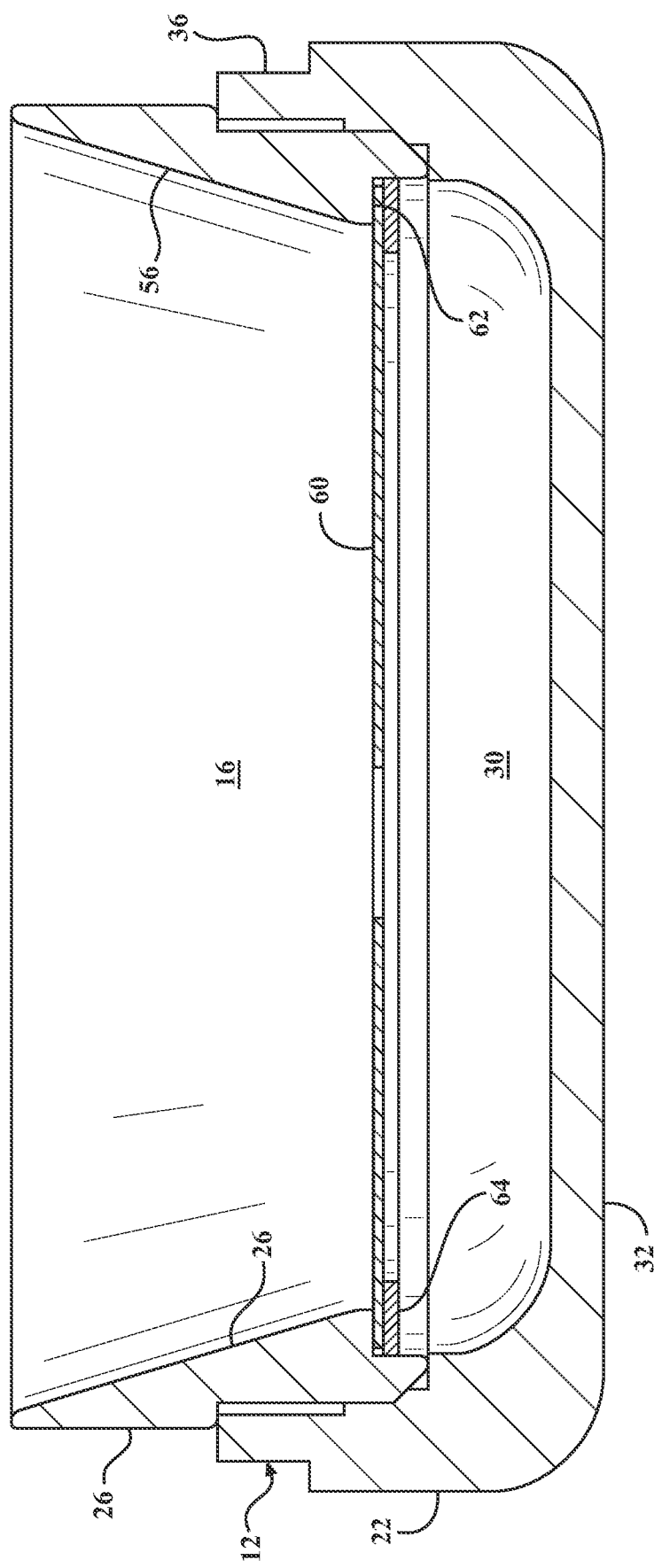
FIG. 4 is a cross-sectional side view of a catch assembly used in the embodiment shown in FIG. 1.
Figure 5:
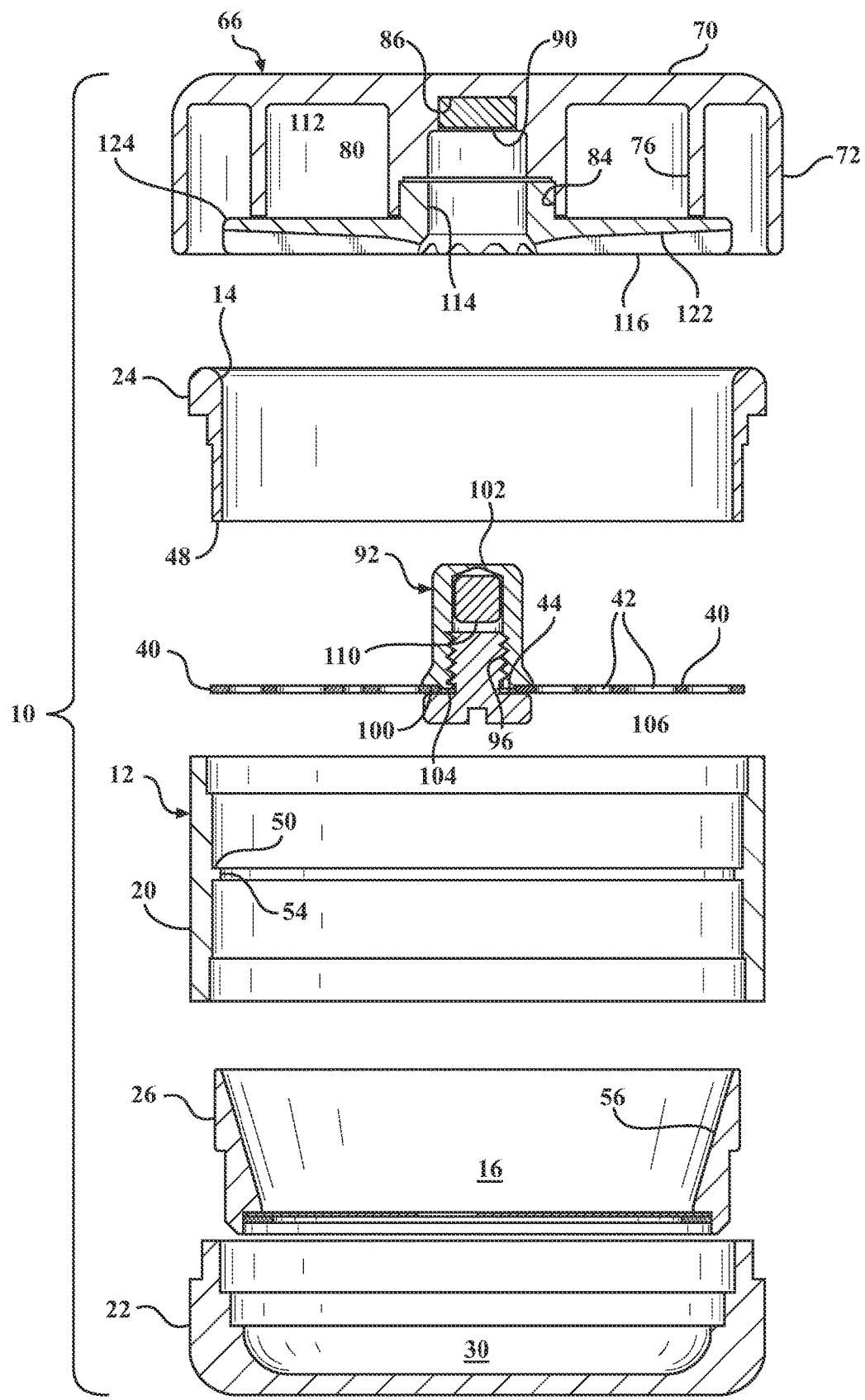
FIG. 5 is a cross-sectional exploded side view of the embodiment shown in FIG. 1.
Figure 6:
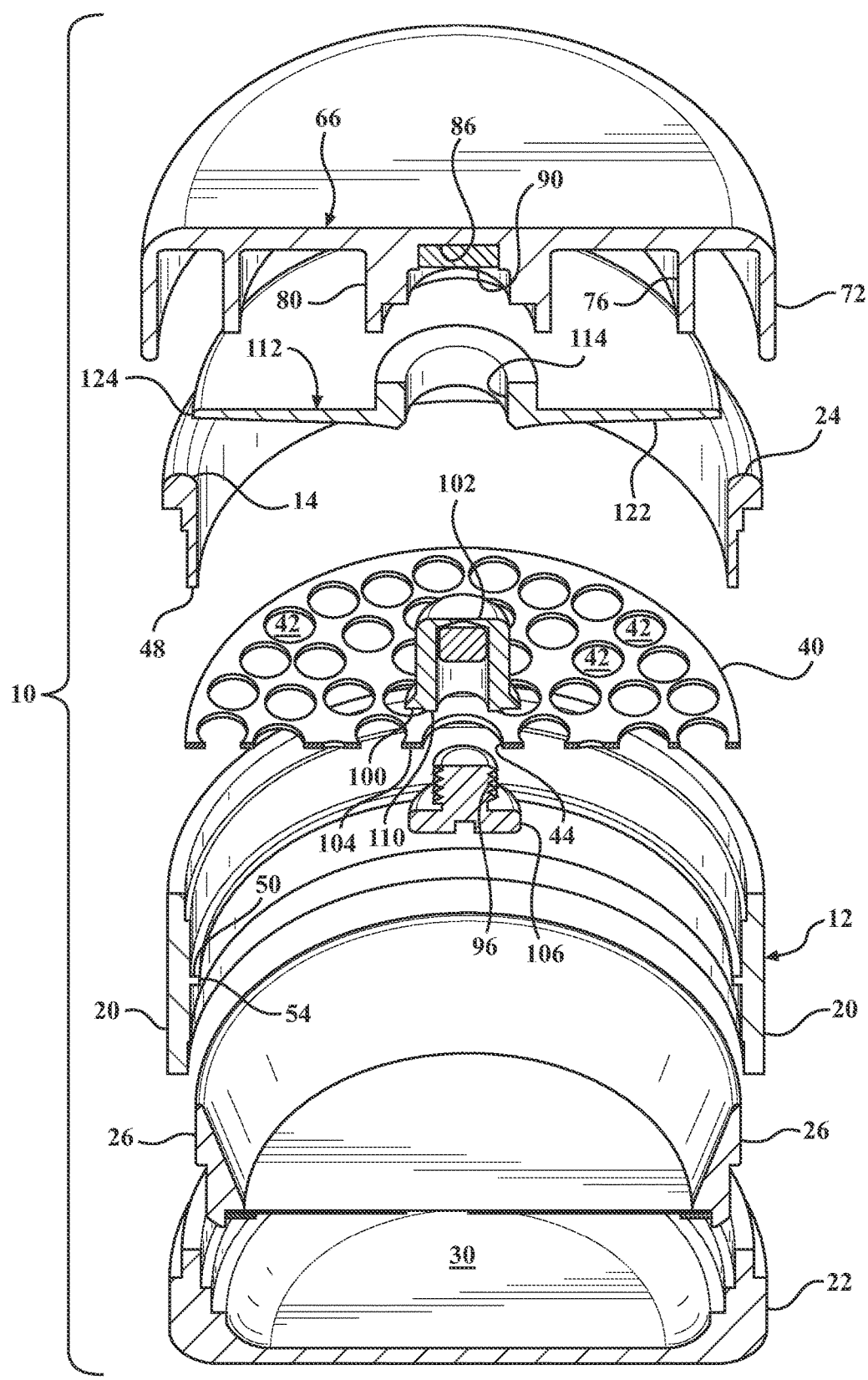
FIG. 6 is an exploded cross-sectional top perspective side view of the embodiment shown in FIG. 1.
Figure 7:
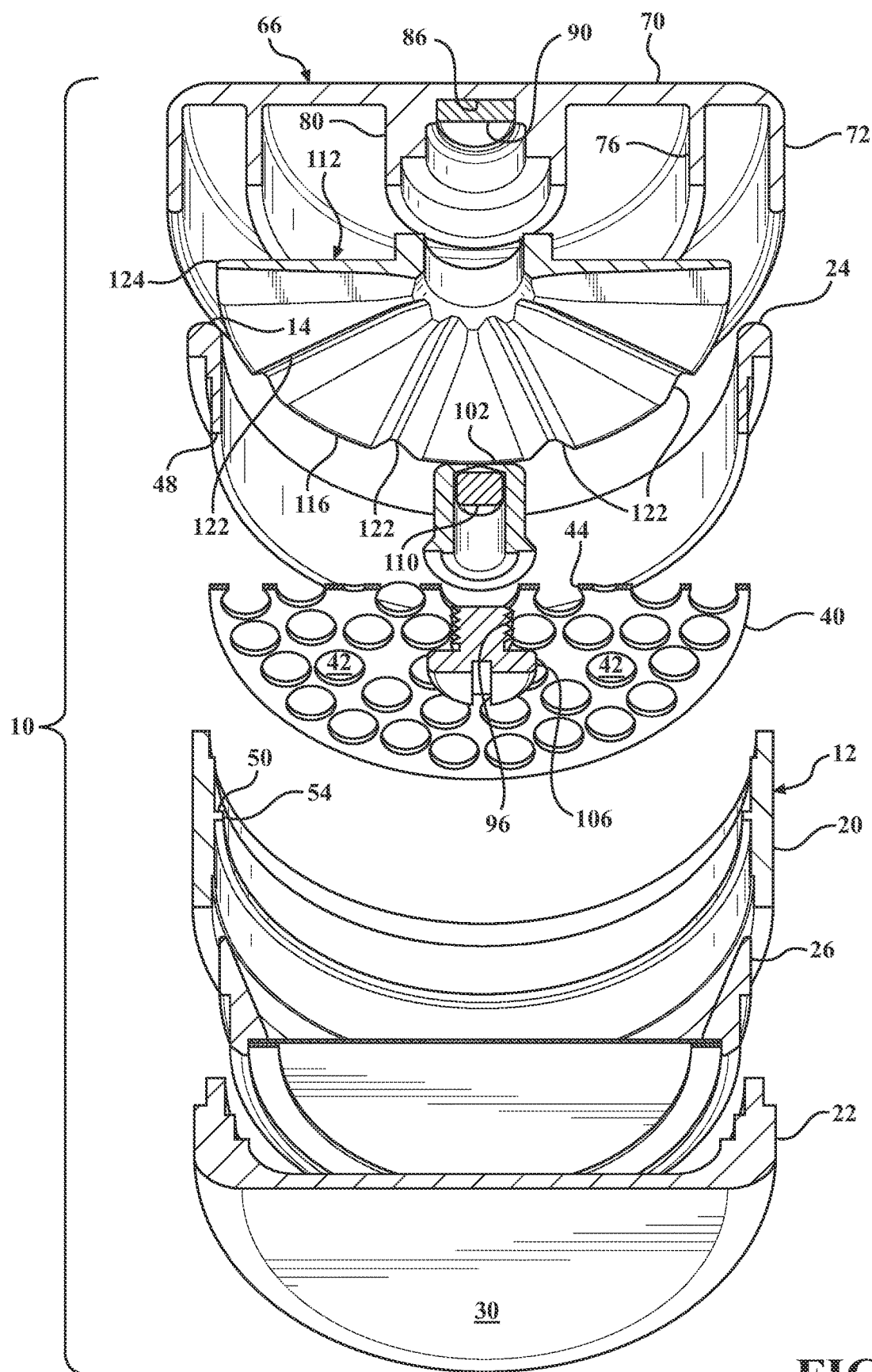
FIG. 7 is an exploded cross-sectional bottom perspective side view of the embodiment shown in FIG. 1.

Referring to FIGS. 1 through 7, a flower mill assembly is generally indicated at 10. The flower mill assembly 10 grinds vegetation that may or may not be previously dried. Vegetation may include flowers, leaves, fruit, seeds and the like. Tobacco would be considered a form of vegetation that would be ground in the flower mill assembly 10.

The flower mill assembly 10 includes a container, generally shown at 12. The container 12 defines an opening 14 and an interior chamber 16. The interior chamber 16 holds vegetation before it is ground and collects the ground vegetation after the vegetation is ground by the flower mill assembly 10.

In the embodiment shown in the Figures, the container 12 includes an outer body 20, a lower catch 22, a rotor sleeve 24, and a tapered catch 26. The outer body 20, the lower catch 22 and the tapered catch 26 are made of aluminum, whereas the rotor sleeve 24 is fabricated from stainless steel. It should be appreciated by those skilled in the art that the type of material used for each of these parts may vary, depending on the cost parameters, design requirements, and the like.

The lower catch 22 defines a removable catch basin 30, which is a part of the interior chamber 16. The lower catch 22 defines a bottom surface 32 of the container 12. The container 12 is cylindrical, allowing for the various parts 20, 22, 24, 26 to threadingly engage each other to form a unitary container 12. The lower catch 22 threadingly engages the tapered catch 26 using threads 34. The lower catch 22 also threadingly engages the outer body 20 using threads 36. The rotor sleeve 24 threadingly engages the outer body 24.

A sifting screen 40 is secured to the container 10 within the interior chamber 16. The sifting screen 40 allows the ground vegetation to pass therethrough while preventing the vegetation that has yet to be ground from passing therepast. The vegetation that has yet to be ground will be generally disposed above the sifting screen 40 within the interior chamber 16, whereas the ground vegetation will fall past the sifting screen 40 and be stored within the interior chamber 16 below the sifting screen 40. The sifting screen 40 includes a plurality of holes 42 that allow ground vegetation to pass therethrough as it falls toward the catch basin 30 within the lower catch 22. While the holes 42 are shown to be circular and of the same dimension, it should be appreciated by those skilled in the art that the holes 42 may vary in quantity and size, as well as shape. The sifting screen 40 includes a center hole 44 that is not used for the sifting function of the sifting screen 40. The center hole 44 defines a central axis 46. The central axis 46 is a central axis for all of the parts of the flower mill assembly 10. The sifting screen 40 is held within the container 12 between a bottom surface 48 of the rotor sleeve 24 and an abutment surface 50 of an inner ring 52 that extends inwardly toward the central axis 46 from an inner surface 54 of the outer body 20.

The tapered catch 26 extends between the inner ring 52 of the outer body 20 and down past the lower catch 22. The tapered catch 26 includes a tapered surface 56 that is directed radially inwardly toward the central axis 46 as the tapered surface 56 gets closer to the lower catch 22. A collection screen 60 is secured to the tapered catch 26 against a tapered relief surface 62 and a screen retaining ring 64. The tapered relief surface 62 extends perpendicularly to the central axis 46. The collection screen 60 allows very fine particles to pass therethrough to be collected within the catch basin 30 of the lower catch 22.

A knob, generally shown at 66, selectively covers the opening 14 of the container 12 to cover and enclose the interior chamber 16. The knob 66 includes a top surface 70 and at least one sidewall 72. In the embodiment shown, the top surface 70 is circular as viewed from the top and planar in cross-section. The sidewall 72 defines a circular cylinder as viewed from the bottom. The inner diameter 74 of the of the sidewall 72 is large enough to allow the knob 66 to cover a top portion of the rotor sleeve 24 and the outer body 20. In other words, the inner diameter 74 of the sidewall 72 is larger than the outer diameter of the container 12.

The knob 66 includes an inner support structure 76 extending out from the top surface 70 in the same direction as the sidewall 72. The support structure 76 has a length less than the length of the sidewall 72. In the embodiment shown, the support structure 76 is a cylindrical wall parallel to the sidewall 72. The support structure 76 will be discussed in greater detail subsequently.

The knob 66 includes a central boss 80 that extends out of the top surface 70 parallel to the sidewall 72 and the support structure 76. The central boss 80 includes a first inner surface 82, a second inner surface 84, and an end surface 86. The second inner surface 84 extends away from the central axis 46 more than the first inner surface 82. In the embodiment shown, the first 82 and second 84 inner surfaces are cylindrical with the second inner surface 84 being threaded. The end surface 86 is parallel to the top surface 70. A retainer 90 is fixedly secured to the end surface 86. In the embodiment shown, the retainer 90 is a first magnet 90.

The flower mill assembly 10 includes a center rod, generally shown at 92. The center rod 92 defines a rod inner surface 94. The rod inner surface 94 is at least partially threaded at 96. The center rod 92 extends between a screen end 100 and an insert end 102. The screen end 100 includes an alignment boss 104 which is received by the center hole 44 of the sifting screen 40. A fastener 106 secures the center rod 92 to the sifting screen 40. The fastener 106 threadingly engages the at least partially threaded inner surface 96.

A second magnet 110 is secured to the insert end 102 of the center rod 92. The second magnet 110 is secured therein through a friction fit, an epoxy or other suitable means to secure the second magnet 110 within the center rod 92 at its insert end 102. The center rod 92 positions the second magnet 110 up and away from the sifting screen 40 disposing it adjacent the first magnet 90 when the knob 66 is placed over the container 12. The attraction between the magnets 90, 110 secure the knob 66 over the container 12 for storage. It may be appreciated by those skilled in the art that a single magnet may replace the first 90 and second 110 magnet combination if the knob 66 or the center rod 92 are fabricated from a ferromagnetic material.

The flower mill assembly 10 includes a rotor, generally shown at 112. The rotor 112 includes a center hub 114 and a grinding surface 116 extending radially away from the center hub 114. The grinding surface 116 faces the sifting screen 40. The center hub 114 includes an outer threaded surface 120. The outer threaded surface 120 of the center hub 114 engages the second inner surface 84 of the central boss 80. Once the rotor 112 is screwed into the center boss 80, there is no lost motion between the rotor 112 and the knob 66. As such, when the knob 66 is rotated, the rotor 112 rotates therewith.

The grinding surface 116 is flat and includes at least one grinding channel 122 cut into the grinding surface 116. Therefore, the rotation of the knob 66 rotates the rotor 112, which in turn, allows the grinding surface 116 and the at least one grinding channel 122 to grind the vegetation extending between the rotor 112 and the sifting screen 40. In the embodiment shown, there are a plurality of grinding channels 122. In particular, there are ten grinding channels 122. Each of these grinding channels 122 extends outwardly in a radial fashion from the center axis 46 by extending out from the center hub 114 out to an outer periphery 124. As such, each of the grinding channels 122 extends across the grinding surface 116.

The grinding channels 122 define a depth within the rotor 112 with respect to the grinding surface 116. The depth of the grinding channels 122 very as they extend along the grinding surface 116. The depth of the grinding channels 122 increases with respect to the grinding surface 116 as you move further away from the central axis 46. The grinding channels 122 are deepest at the outer periphery 124.

Figure 8:
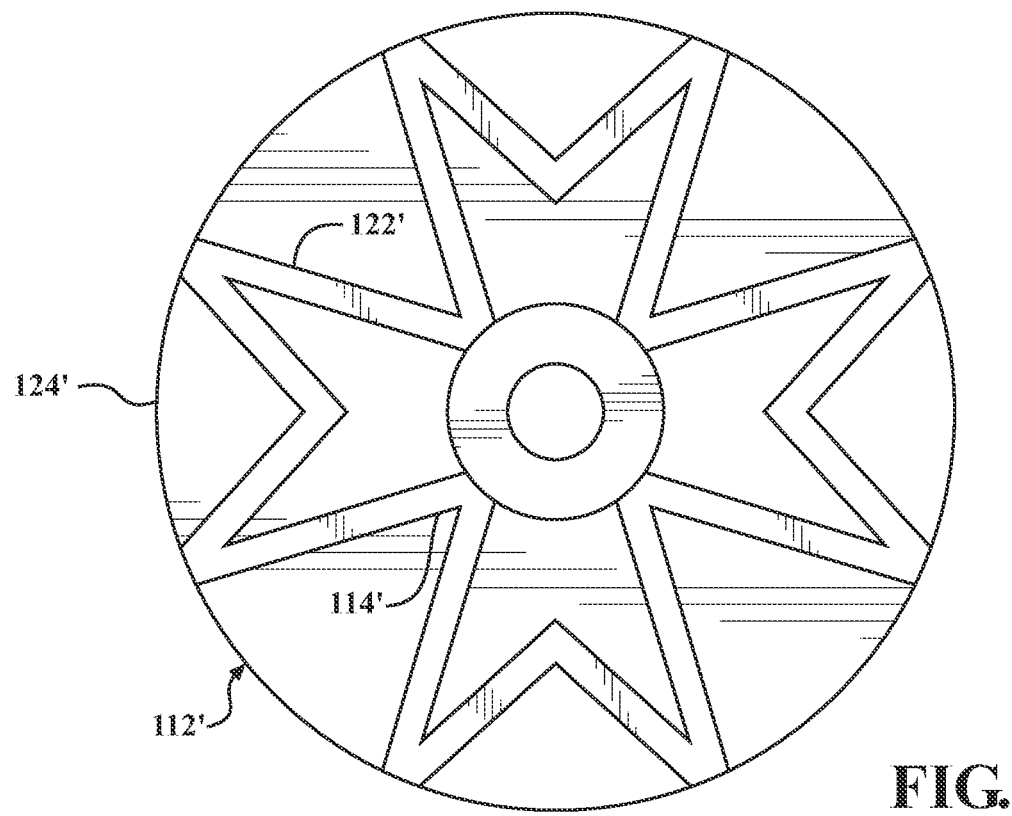
FIG. 8 is a bottom view of an alternative embodiment of a rotor.

Referring to FIG. 8, an alternative embodiment of the rotor 112 is shown at 112', wherein like primed numerals represent similar elements as those shown in the embodiment shown in FIGS. 1 through 7. In this embodiment, the rotor 112' includes a single grinding channel 122' that serpentines between the center hub 114' and the outer periphery 124'.

Figure 9:
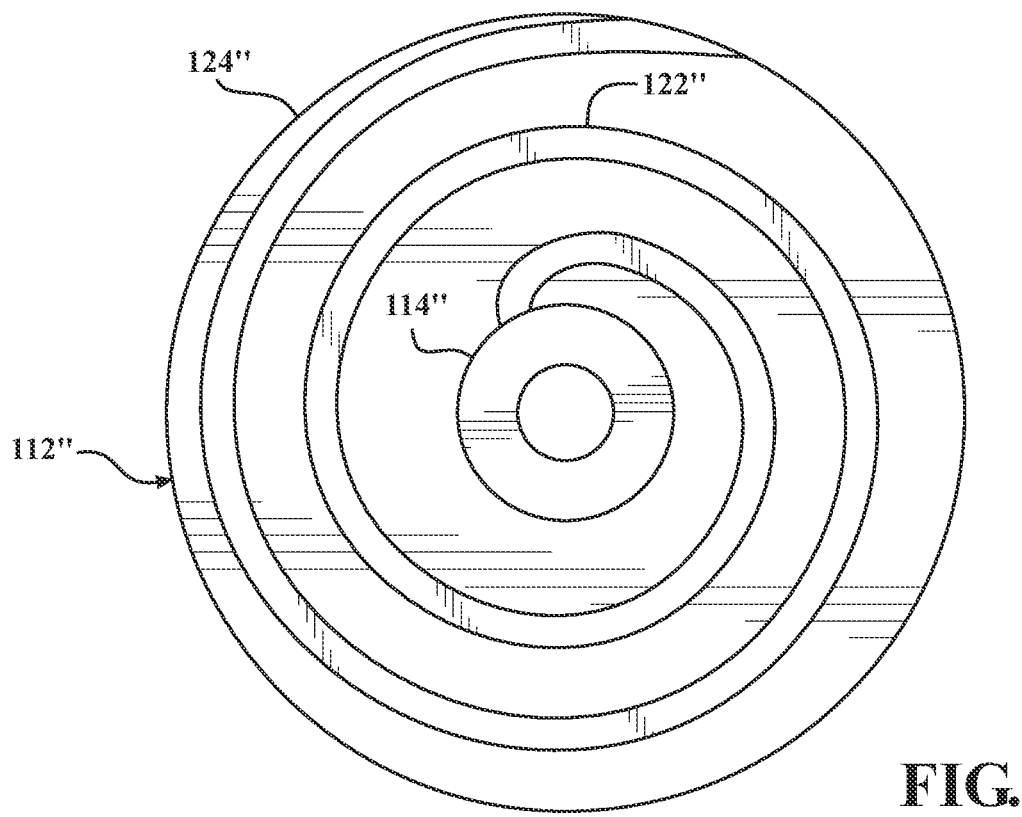
FIG. 9 is a bottom view of a second alternative embodiment of a rotor.

Referring to FIG. 9, a second alternative embodiment of the rotor 112 is shown at 112", wherein like double primed numerals represent similar elements as those shown in the embodiments shown in FIGS. 1 through 7. In this embodiment, the rotor 112" includes a single grinding channel 122" that is one continuous groove 122" having an ever-increasing radius of curvature as the grinding channel 122" extends between the center hub 114" and the outer periphery 124".

Although not shown, one or more of the component parts 20, 22, 24, 26 may be combined to create a container 12 with fewer parts. This may be possible with a change in material used to fabricate the container 12 and all of its component parts.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A flower mill for grinding vegetation into ground vegetation, said flower mill comprising:

a container defining an opening and an interior chamber for holding vegetation before it is ground and for collecting ground vegetation after the vegetation is ground;

a sifting screen secured to said container within said interior chamber, said sifting screen allowing the ground vegetation to pass therethrough while preventing the vegetation from passing therethrough;

a center rod fixedly secured to said sifting screen, said center rod extending through a portion of said interior chamber toward the opening of said container;

a knob for covering said opening of said container to close said interior chamber, said knob including a central boss for receiving said center rod therein;

a rotor secured to said knob, said rotor defining a grinding surface, a center axis, and at least one grinding channel cut into said grinding surface, whereby rotation of said rotor grinds the vegetation disposed adjacent said grinding surface and said at least one grinding channel; and a retainer disposed within said central boss for securing said knob to said container and said retainer includes at least one magnet, wherein said retainer is configured such that said center rod and said retainer do not contact when the knob is in a closed position.

2. A flower mill assembly as set forth in claim 1 wherein at least one portion of said at least one grinding channel extends radially outwardly from said center axis.

3. A flower mill assembly as set forth in claim 1 wherein said at least one grinding channel extends radially from said center axis across said grinding surface.

4. A flower mill assembly as set forth in claim 3 wherein said at least one grinding channel defines a depth within said rotor with respect to said grinding surface.

5. A flower mill assembly as set forth in claim 1 wherein said depth of said at least one grinding channel varies as it extends along said grinding surface.

6. A flower mill assembly as set forth in claim 5 wherein said depth of said at least one grinding channel increases moving away from said central axis.

7. A flower mill assembly as set forth in claim 1 wherein said grinding surface includes a flat portion.

8. A flower mill assembly as set forth in claim 1 wherein said container includes a removable catch basin at a distal end opposite said opening.

9. A flower mill assembly as set forth in claim 8 including a collection screen disposed within said container adjacent said catch basin.

10. A flower mill assembly as set forth in claim 1 wherein said knob rotates about said center axis when said knob is held in place over said opening of said container.

11. A flower mill assembly as set forth in claim 10 wherein said at least one magnet of the retainer includes a first magnet secured to said knob and a second magnet secured to said container.

12. A flower mill assembly as set forth in claim 1 wherein said container includes an outer body and a rotor sleeve partially insertable into said outer body with said sifting screen secured there between.

13. A flower mill assembly for grinding vegetation into ground vegetation, said flower mill assembly comprising:
a container defining an opening and an interior chamber for holding vegetation before it is ground and for collecting ground vegetation after the vegetation is ground;
a sifting screen secured to said container within said interior chamber, said sifting screen allowing the ground vegetation to pass therethrough while preventing the vegetation from passing therethrough;
a center rod fixedly secured to said sifting screen, said center rod extending through a portion of said interior chamber toward the opening of said container;
a knob for covering said opening of said container to close said interior chamber, said knob including a central boss for receiving said center rod therein; and
a rotor secured to said knob, said rotor defining a grinding surface, a center axis, and at least one grinding channel cut into said grinding surface, whereby rotation of said rotor grinds the vegetation disposed adjacent said grinding surface and said at least one grinding channel; and
wherein said knob and said central boss are configured such that said center rod and said boss do not contact when the knob is in a closed position.

* * * * *